United States Patent
McCarthy et al.

(10) Patent No.: US 9,389,787 B2
(45) Date of Patent: Jul. 12, 2016

(54) SYSTEM AND METHOD FOR SIMULATING A PERSISTENT BYTE ADDRESSABLE STORAGE DEVICE ON A PERSISTENT BLOCK ADDRESSABLE STORAGE DEVICE

(71) Applicant: NetApp, Inc., Sunnyvale, CA (US)

(72) Inventors: Brian S. McCarthy, Nashua, NH (US); Donna M. Duffy, Arlington, MA (US); Farshid Eslami Sarab, San Jose, CA (US); Tabriz Holtz, Los Gatos, CA (US); Afshin Salek Ardakani, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 99 days.

(21) Appl. No.: 14/277,988

(22) Filed: May 15, 2014

(65) Prior Publication Data
US 2015/0331607 A1    Nov. 19, 2015

(51) Int. Cl.
*G06F 3/06*    (2006.01)
*G10H 3/06*    (2006.01)

(52) U.S. Cl.
CPC .............. *G06F 3/061* (2013.01); *G06F 3/0655* (2013.01); *G06F 3/0664* (2013.01); *G06F 3/0688* (2013.01); *G10H 3/06* (2013.01)

(58) Field of Classification Search
CPC . G06F 12/0246; G06F 3/0679; G06F 3/0604; G06F 12/00; G06F 12/0238; G06F 3/0688; G06F 3/061; G06F 3/0655; G06F 3/0664
USPC .................................................. 711/103, 154
See application file for complete search history.

(56) References Cited

U.S. PATENT DOCUMENTS

| | | | |
|---|---|---|---|
| 7,249,150 B1 | 7/2007 | Watanabe et al. | |
| 7,698,306 B2 | 4/2010 | Watanabe et al. | |
| 7,937,367 B2* | 5/2011 | Watanabe | G06F 11/1471 707/640 |
| 8,510,496 B1 | 8/2013 | Totolos, Jr. et al. | |
| 8,751,598 B1 | 6/2014 | Shankar | |
| 8,799,557 B1 | 8/2014 | Chen | |
| 2014/0019992 A1 | 1/2014 | Morozov et al. | |
| 2014/0165057 A1 | 6/2014 | Caradonna et al. | |
| 2014/0298078 A1 | 10/2014 | Keremane et al. | |
| 2015/0149144 A1* | 5/2015 | Davis | G06F 17/5009 703/20 |

* cited by examiner

*Primary Examiner* — Jasmine Song

(74) *Attorney, Agent, or Firm* — LeClairRyan, a Professional Corporation

(57) ABSTRACT

A persistent random-access, byte-addressable storage device may be simulated on a persistent random-access, block-addressable storage device of a storage system configured to enable asynchronous buffered access to information persistently stored on the block-addressable device. Buffered access to the information is provided, in part, by a portion of kernel memory within the storage system allocated as a staging area for the simulated byte-addressable storage device to temporarily store the information destined for persistent storage. One or more asynchronous interfaces may be employed by a user of the simulated byte-addressable device to pass metadata describing the information to a driver of the device, which may process the metadata to copy the information to the staging area. The driver may organize the staging area as one or more regions to facilitate buffering of the information (data) prior to persistent storage on the block-addressable storage device. Each asynchronous access interface is configured to ensure that an order of changes to the data in the persistent storage is consistent with the order of arrival of the changes at the driver.

18 Claims, 5 Drawing Sheets

SYSTEM AND METHOD FOR SIMULATING A PERSISTENT BYTE ADDRESSABLE STORAGE DEVICE ON A PERSISTENT BLOCK ADDRESSABLE STORAGE DEVICE

BACKGROUND

1. Technical Field

The subject matter herein relates to storage systems and, more specifically, to simulating a persistent random-access, byte-addressable storage device on a persistent random-access, block-addressable storage device of a storage system.

2. Background Information

A storage system may include a file system configured to provide storage service to one or more clients relating to storage and retrieval of information on persistent random-access, block-addressable storage devices, such as disks. To improve the reliability and stability of such storage service, the storage system may employ a persistent random-access, byte-addressable storage device, such as a non-volatile random access memory (NVRAM). The NVRAM typically includes a back-up battery or other built-in, last-state retention capability (e.g., non-volatile semiconductor memory) that is capable of maintaining information in light of a failure to the storage system.

In addition, the performance of the storage service provided by the storage system may be improved using the NVRAM. Widely accepted file system standards, such as the Network File System (NFS), specify that a storage system should not reply to a client with respect to completion of a modifying data access request, e.g., a write operation and associated data, until the results of the request are written to persistent storage. The storage system may utilize the NVRAM to record or log the modifying request as processed by the file system. By logging the modifying request to NVRAM, a reply can be returned to the client with respect to completion of the request before the results of the request have been written to disk.

For a storage system that may not employ a NVRAM, a disk (or other similar secondary storage) may be used as persistent storage for simulating the NVRAM. However, the performance of such a storage system may be impacted as the logging of modifying requests to NVRAM is faster than writing of the results of the request to disk. Moreover, users of the NVRAM, e.g., a file system, typically expect certain properties from the NVRAM including preservation of an order of changes associated with the modifying requests to the NVRAM.

BRIEF DESCRIPTION OF THE DRAWINGS

The above and further advantages of the subject matter herein may be better understood by referring to the following description in conjunction with the accompanying drawings in which like reference numerals indicate identically or functionally similar elements, of which.

OVERVIEW

Figure 1:
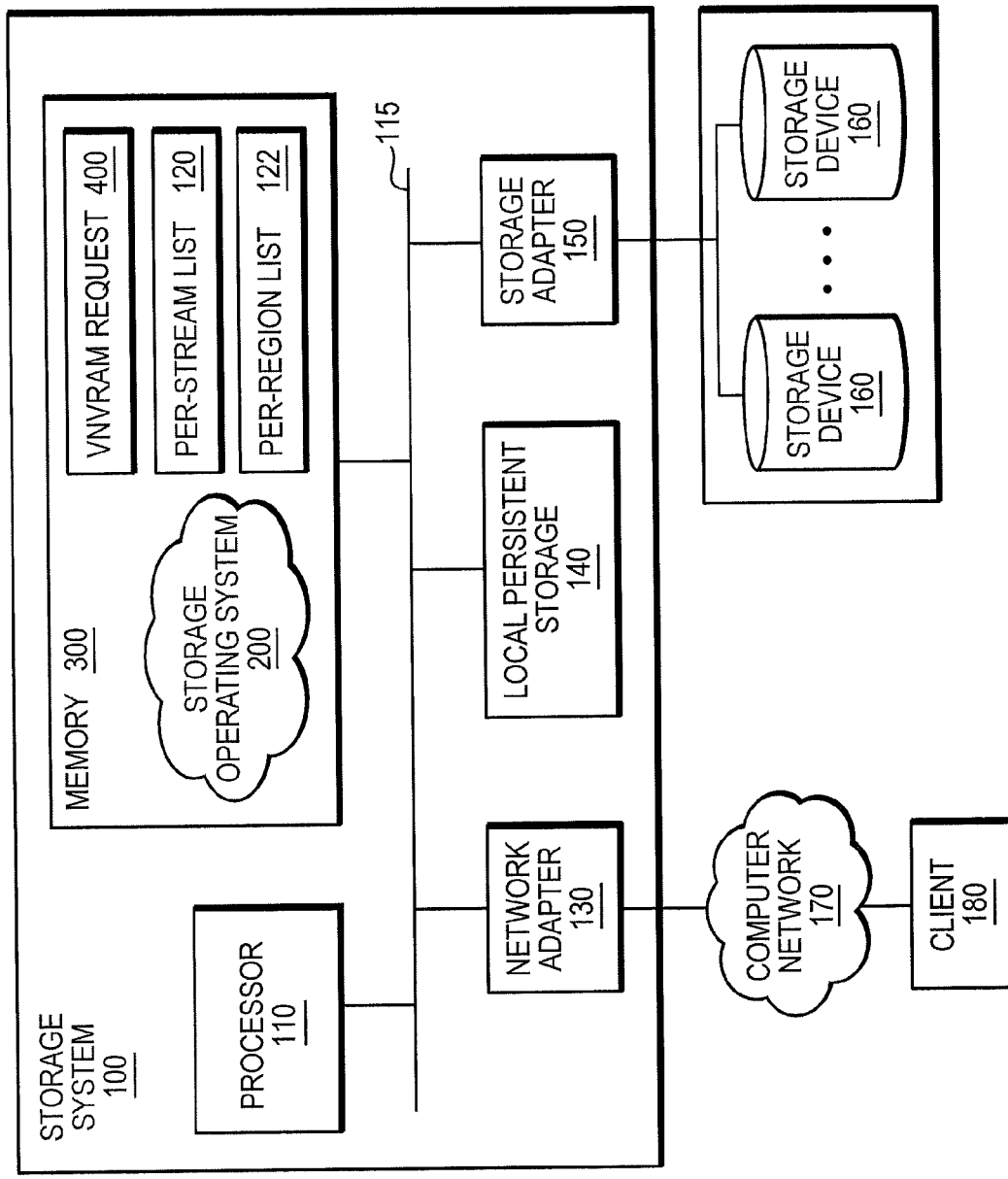
FIG. 1 is a block diagram of a storage system.

The subject matter described herein provides a system and method for simulating a persistent random-access, byte-addressable storage device on a persistent random-access, block-addressable storage device of a storage system configured to enable asynchronous buffered access to information persistently stored on the block-addressable device. Buffered access to the information is provided, in part, by a portion of kernel memory within the storage system allocated as a staging area for the simulated byte-addressable storage device to temporarily store the information destined for persistent storage. One or more asynchronous interfaces may be employed by a user of the simulated byte-addressable device to pass metadata describing the information to a driver of the device, which may process the metadata to access, i.e., copy, the information to the staging area. To that end, the driver may organize the staging area as one or more regions to facilitate temporary storage of the information, e.g., data of one or more write operations, prior to persistent storage on the block-addressable storage device. Notably, each asynchronous access interface is configured to ensure that an order of changes to the data in the persistent storage is consistent with the order of arrival of the changes at the driver. As described herein, the system and method reduces the number of copy operations between each region and the block-addressable storage device while maintaining ordering.

Illustratively, the access interfaces may be embodied as application programming interfaces, whereas the simulated byte-addressable storage device may be embodied as a simulated non-volatile random access memory (NVRAM) device, i.e., a simulated device, and the block-addressable storage device may be embodied as local persistent storage, i.e., a backing store. Moreover, the user of the simulated device may be a software module executing on the storage system and configured to employ one or more of the access interfaces to copy the data to the staging area and to the backing store depending on semantics of the interface. The driver, i.e., a virtual NVRAM (VNVRAM) driver, may translate the metadata to one or more incoming requests describing the location and ordering of the data. The incoming requests may reside within one or more streams specified by an argument to the interface, wherein each incoming request is assigned a transfer identifier (XID).

In an aspect of the subject matter, the VNVRAM driver may be configured to support a first access interface that provides a non-volatile direct memory access (nvdma) write interface having an argument that imposes ordering of requests within a stream. Illustratively, an incoming request associated with the write interface may be marked with a special flag, i.e., an XORDER flag, that specifies dependency to all previous requests in the stream. Specifically, the XORDER flag instructs the VNVRAM driver to ensure that no portions of overlapping previous requests (e.g., describing previous write operations of data) may be persistently stored after the incoming request has been committed to the backing store. The XORDER flag thus has the same effect as ensuring that all previous requests of the stream are committed, i.e., processed and persistently stored, on the backing store before the incoming request marked with the flag is processed and written to the backing store, but does not necessarily require that all write operations through the access interface be committed to the backing store. For example, a write operation that is completely overwritten by a subsequent write operation need not be written to the backing store.

In addition, a second access interface may provide a nvdma ordered write interface that imposes ordering of an incoming request with respect to one or more requests among streams. The incoming request associated with the ordered write interface may specify one or more previous requests, i.e., pre-requisite requests, that provide dependency to the incoming request. That is, the semantics of the ordered write interface ensure that the incoming request may not be persistently stored in the backing store until all of the specified pre-requisite requests upon which the dependency exists are persistently stored (written) in the backing store. Illustratively, each pre-requisite request is identified by a (stream, XID) pair, wherein the stream is an identifier of the stream on which the pre-requisite request resides and the XID is the transfer identifier of the pre-requisite request.

DESCRIPTION

FIG. 1 is a block diagram of a storage system 100 having one or more processors 110, a memory 300, a network adapter 130, local persistent storage 140 and a storage adapter 150 interconnected by a system interconnect 115, such as bus. The memory 300 may include memory locations that are addressable by the processor and adapters for storing software programs and/or processes and data structures associated with the subject matter described herein. The processor and adapters may, in turn, include processing elements and/or logic circuitry configured to execute the software programs/processes and manipulate the data structures, such as one or more virtual non-volatile random access memory (VNVRAM) requests 400, a per-stream list 120 and a per-region list 122. A storage operating system 200, portions of which are typically resident in memory and executed by the processor 110, functionally organizes the system 100 by, inter alia, invoking operations in support of a storage service implemented and provided by the system. Illustratively, the storage operating system 200 may be implemented as a set of kernel mode processes that may be decomposed into one or more threads.

It will be apparent to those skilled in the art that other processing and memory means, including various computer readable media, may be used for storing and executing program instructions pertaining to the subject matter herein. It is also expressly contemplated that the various processes, threads, software layers, architectures and procedures described herein can be implemented in hardware, firmware, software or a combination thereof. Moreover, it is expressly contemplated that the various software programs, processes, threads, and layers described herein may be embodied as modules configured to operate in accordance with the disclosure, e.g., according to the functionality of a similar program, process or layer.

The network adapter 130 may include one or more ports adapted to couple the system 100 to one or more clients 180 over computer network 170, which may include one or more point-to-point links, wide area networks, virtual private networks implemented over a public network (Internet) or a shared local area network. The network adapter 130 may thus include the mechanical, electrical and signaling circuitry needed to connect the storage system to the network which, illustratively, may embody an Ethernet network or a Fibre Channel (FC) network. Each client 180 may be a general-purpose computer configured to execute one or more applications to interact with the system 100 in accordance with a client/server model of information delivery. That is, the client may request the storage service of the storage system, and the system may return the results of the service requested by the client, by exchanging packets over the network 170. The client may issue packets including file-based access protocols, such as the Common Internet File System (CIFS) protocol or Network File System (NFS) protocol, over the Transmission Control Protocol/Internet Protocol (TCP/IP) when accessing information in the form of storage containers, such as files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of storage containers, such as blocks or logical units (luns).

In an aspect of the subject matter, the local persistent storage 140 may be embodied as one or more persistent random-access, block-addressable storage devices, such as solid state drives or hard disk drives, utilized by the system to persistently store information provided by one or more processes that execute as user and/or kernel mode processes or threads on the system. The storage adapter 150 illustratively cooperates with the storage operating system 200 executing on the storage system 100 to access information requested by the client. The information may be stored on any type of attached array of writable storage devices 160, such as video tape, optical, DVD, magnetic tape, bubble memory, electronic random access memory, micro-electro mechanical and any other similar storage device media adapted to store information, including data and parity information. The storage adapter 150 may include one or more ports having input/output (I/O) interface circuitry that couples to the storage devices over an I/O interconnect arrangement, such as a conventional serial attached SCSI (SAS) or FC link topology.

To facilitate access to the storage devices, the storage operating system 200 illustratively implements a high-level module, such as a write-anywhere file system, that cooperates with one or more virtualization modules to "virtualize" the storage space provided by devices. The file system logically organizes the information as a hierarchical structure of named storage containers, such as directories, files and/or aggregates having one or more volumes that hold files and/or luns, on the devices. Each "on-disk" file may be implemented as set of disk blocks configured to store information, such as data, whereas the directory may be implemented as a specially formatted file in which names and links to other files and directories are stored. The virtualization module(s) allow the file system to further logically organize information as blocks on the disks that are exported as named luns. In an aspect of the subject matter, the storage operating system is preferably the NetApp® Data ONTAP™ operating system available from NetApp Inc., Sunnyvale, Calif. that implements a Write Anywhere File Layout (WAFL®) file system. However, it is expressly contemplated that any appropriate storage operating system may be enhanced for use in accordance with the subject matter described herein.

Figure 2:
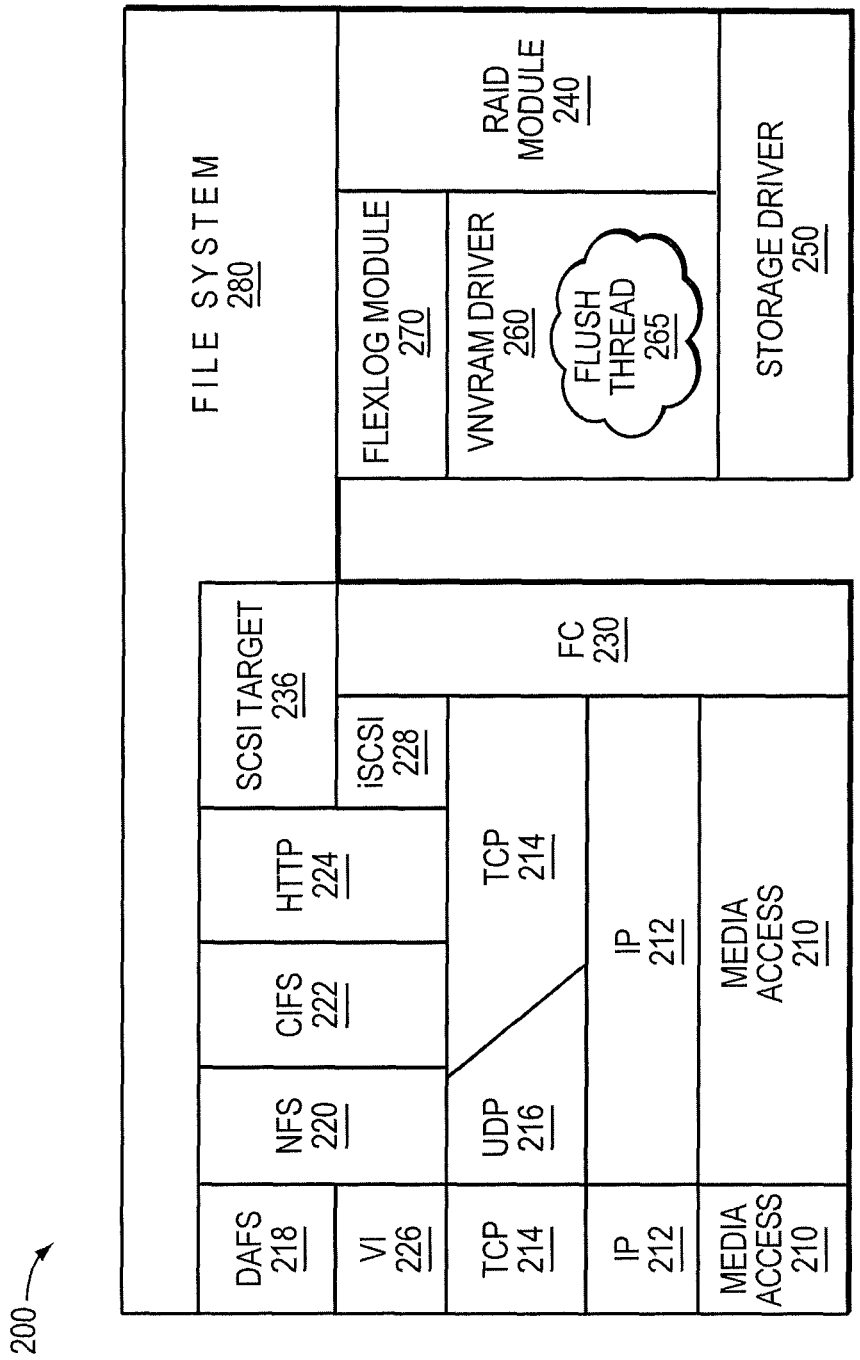
FIG. 2 is a block diagram of a storage operating system.

FIG. 2 is a block diagram of the storage operating system 200 that may be advantageously used with the subject matter described herein. In an aspect of the subject matter, the storage operating system includes a series of software layers organized to form an integrated network protocol stack or, more generally, a multi-protocol engine that provides data paths for clients to access information stored on the system using file and block access protocols. The protocol stack includes a media access layer 210 of network drivers (e.g., gigabit Ethernet drivers) configured to interface to network protocol layers, such as an IP layer 212 and its supporting transport mechanisms, a TCP layer 214 and a User Datagram Protocol (UDP) layer 216. A file system protocol layer provides multi-protocol file access and, to that end, includes support for the Direct Access File System (DAFS) protocol 218, the NFS protocol 220, the CIFS protocol 222, and the Hypertext Transfer Protocol (HTTP) protocol 224. A virtual interface (VI) layer 226 implements a VI architecture to provide direct access transport (DAT) capabilities, such as remote direct memory access (RDMA), in accordance with the DAFS protocol 218.

In an aspect of the subject matter, an iSCSI driver layer 228 provides block protocol access over the TCP/IP network protocol layers, and a FC driver layer 230 is configured to receive and transmit block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the system 100. In addition, the storage operating system includes a Redundant Array of Independent (or Inexpensive) Disks (RAID) layer or module 240 that implements a disk storage protocol, such as a RAID protocol, a storage driver layer 250 that implements a disk access protocol such as, e.g., a SCSI protocol, and a FlexLog module 270 that provides a generic non-volatile logging architecture. A VNVRAM driver 260 is illustratively implemented as a kernel mode process configured to provide services to the RAID and file system modules and, to that end, includes a flush thread 265 configured to store (write) information to the local persistent storage 140, as described herein.

Bridging the disk software layers with the integrated network protocol stack layers is the file system module 280 configured to implement a virtualization system of the storage operating system 200 through the interaction with one or more virtualization modules embodied as, e.g., a virtual disk (vdisk) module (not shown) and a SCSI target module 236. The vdisk module enables access by administrative interfaces in response to a user (system administrator) issuing commands to the system 100. The SCSI target module 236 is generally disposed between the iSCSI and FC drivers 228, 230 and the file system 280 to provide a translation layer of the virtualization system between a logical unit space and a file system space, where logical units are represented as named storage containers within the file system space.

The file system 280 is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

As used herein, the term "storage operating system" generally refers to the computer-executable code operable on a computer to perform a storage function that manages data access and may, in the case of a storage system 100, implement data access semantics of a general-purpose operating system. The storage operating system can also be implemented as a microkernel, an application program operating over a general-purpose operating system, such as UNIX® or Windows XP®, a general-purpose operating system with configurable functionality, or as one or more processes configured for storage applications as described herein.

In addition, it will be understood to those skilled in the art that the subject matter described herein may apply to any type of special-purpose (e.g., file server, filer or storage serving appliance) or general-purpose computer, including a standalone computer or portion thereof, embodied as or including a storage system. Moreover, the described subject matter can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the subject matter herein may be utilized with any suitable file system, including a write in place file system.

As noted, a storage system may employ a persistent random-access, byte-addressable storage device, such as a non-volatile random access memory (NVRAM), to improve the reliability, stability and performance of the storage service provided by the storage system. In response to receiving a modifying data access request (such as a write request) from a client, the file system may use an address of kernel memory (i.e., an area of memory 300 allocated to the portions of the storage operating system residing in memory) to create an operation (such as a write operation) including (write) data. The data may then be temporarily stored at the kernel memory address (i.e., source buffer), while metadata describing the buffer (such as source address of the source buffer, as well as an offset and length in NVRAM) may be passed as a NVRAM request to a direct memory access (DMA) controller for recording (logging) in the NVRAM using one or more application programming interfaces, i.e., access interfaces. The DMA controller may load the NVRAM request into a queue and program DMA circuitry to transfer the data contents of the source buffer to NVRAM. Upon completion of the transfer, the DMA controller may mark the NVRAM request as done. The file system can then either inquire as to the state of the NVRAM request or wait until the controller notifies it that the request has been stored in NVRAM. At that point, the file system can acknowledge completion of request processing to the client.

For a storage system that may not employ a NVRAM, a combination of byte addressable memory and a block addressable disk (or other similar secondary storage) may be used as persistent storage for simulating the NVRAM. In an implementation of such a storage system platform, an access interface may be employed to access, i.e., copy, the data to the persistent storage used for simulating the NVRAM. However, the access interface for the platform without the NVRAM may be different from the access interface for the platform having the NVRAM, thereby requiring the storage operating system to switch among those interfaces depending on the storage system platform. In addition, the performance of the storage system platform without the NVRAM may be impacted as the logging of modifying requests to the NVRAM is faster than writing of the results (data) of the request to disk. Moreover, users of the NVRAM, e.g., a file system, typically expect certain properties from the NVRAM including preservation of an order of changes of the data associated with the modifying requests to the NVRAM.

The subject matter described herein provide a system and method for simulating a persistent random-access, byte-addressable storage device on a persistent random-access, block-addressable storage device of a storage system configured to enable asynchronous buffered access to information persistently stored on the block-addressable device. Buffered access to the information is provided, in part, by a portion of kernel memory within the storage system allocated as a staging area for the simulated byte-addressable storage device to temporarily store the information destined for persistent storage. One or more asynchronous interfaces may be employed by a user of the simulated byte-addressable device to pass metadata describing the information to a driver of the device, which may process the metadata to access, i.e., copy, the information to the staging area. To that end, the driver may organize the staging area as one or more regions to facilitate temporary storage of the information, e.g., data of one or more write operations, prior to persistent storage on the block-addressable storage device. Notably, each asynchronous access interface is configured to ensure that an order of changes to the data in the persistent storage is consistent with the order of arrival of the changes at the driver. As described herein, the system and method reduces the number of copy operations between each region and the block-addressable storage device while maintaining ordering.

Illustratively, the access interfaces may be embodied as application programming interfaces (APIs), whereas the simulated byte-addressable storage device may be embodied as a simulated NVRAM device, i.e., a simulated device, and the block-addressable storage device may be embodied as local persistent storage, i.e., a backing store. Moreover, the user of the simulated device may be a software module executing on the storage system and configured to employ one or more of the access interfaces to copy the data, e.g., from the source buffer to the staging area and then to the backing store depending on semantics of the interface. The driver, i.e., a virtual NVRAM (VNVRAM) driver, may translate the metadata to one or more incoming requests describing the location and ordering of the data. The incoming requests may reside within one or more streams specified by an argument to the interface, wherein each incoming request is assigned a transfer identifier (XID) by the driver.

In an aspect of the subject matter, the user (e.g., caller) of the access interface may use the XIDs to inquire as to the completion of the incoming requests. Notably, the XIDs are ordered and monotonically increasing beginning at a small integer value at system initialization and increasing until cessation of system operation. A first XID with a value lower than a second XID is configured to represent a request (transaction) initiated earlier in time. Advantageously, the VNVRAM driver 260 may use the monotonically increasing nature of the XIDs to minimize the use of resources required to represent the status of previous requests. It may not be necessary to preserve requests prior to the lowest XID which has not been completed. Instead, a single lower limit on pending XIDs may be maintained and all other records of previous requests may be discarded, since a comparison of the XID to the lowest incomplete XID is sufficient to declare any previous XID done.

Figure 3:
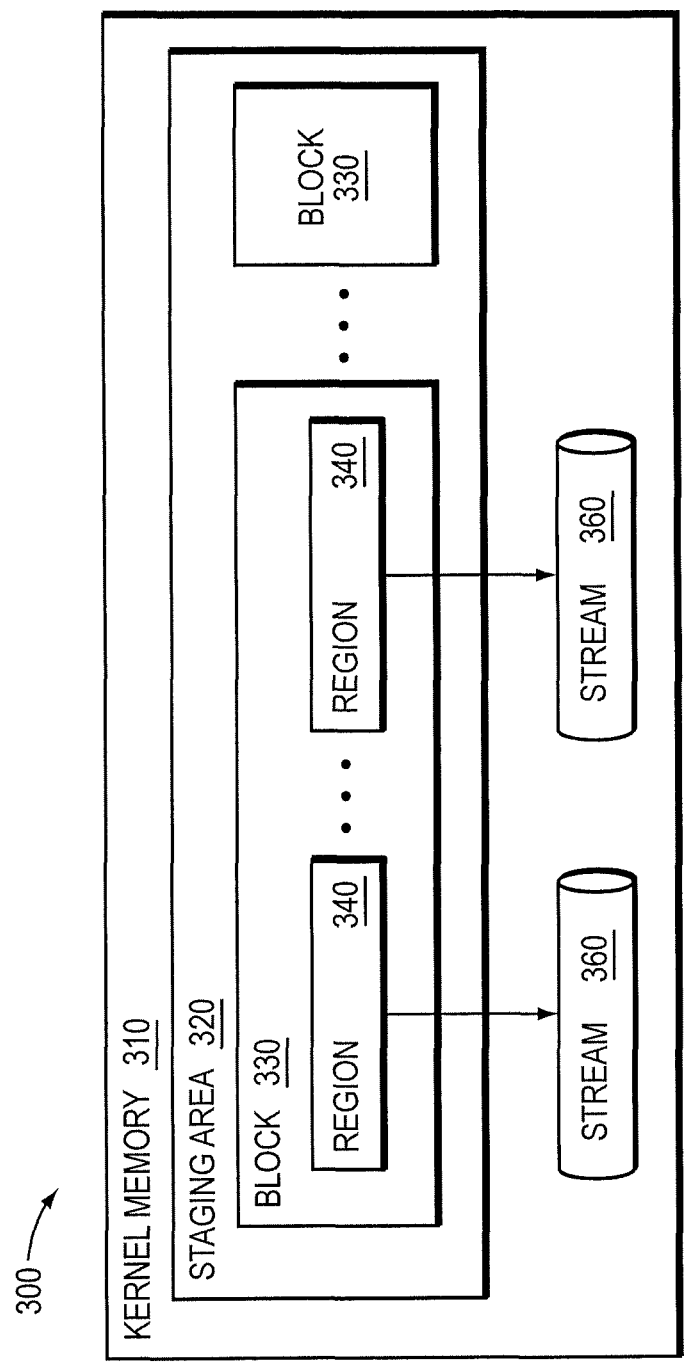
FIG. 3 is a block diagram of a memory of the storage system.

FIG. 3 is a block diagram of the memory of the storage system that may be advantageously used with subject matter described herein. To simulate the NVRAM on the local persistent storage 140, the memory 300 may include a portion of kernel memory 310 allocated as a staging area 320 for use by the VNVRAM driver 260 to temporarily store, e.g., data of one or more write operations destined for persistent storage 140. The staging area 320 may be apportioned into blocks 330 of various sizes, e.g., a staging area of 512 MB may be apportioned into blocks of 100 MB, 5 MB, 20 MB and 387 MB sizes. Each software module of the storage operating system that uses NVRAM may be assigned one (or two) blocks, e.g., the RAID module 240 may be assigned one block and the file system module 280 may be assigned two blocks. In an aspect of the subject matter, the VNVRAM driver 260 may divide each block into one or more regions 340. Each region may include information to facilitate management of copied data to be written to the local persistent storage, i.e., the backing store. Further, each region 340 may be associated with a logical construct, i.e., a stream 360. Alternatively, there may be one stream associated with all of the regions of a block or there may be one stream associated with a subset of the regions.

Figure 4:
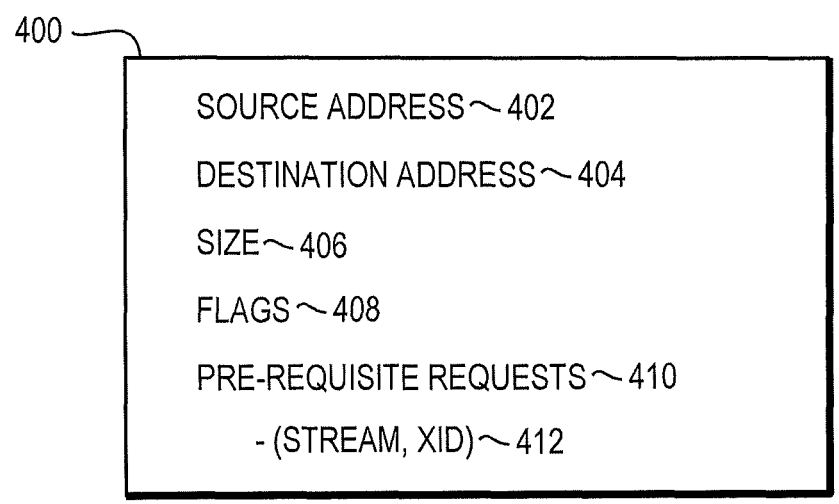
FIG. 4 is a block diagram of a virtual non-volatile random access memory (VNVRAM) request.

Using the access interfaces described herein, the file system 280 (or other software module such as the RAID module 240) may pass incoming requests to the VNVRAM driver 260, which may interpret the processing requested by the interface semantics as provided by the file system 280. In an aspect of the subject matter, the requests passed to the VNVRAM driver 260 may be organized within one or more streams 360 by the file system 280, which creates and registers the stream(s) with the driver. In response to such interpretation, the VNVRAM driver 260 may create corresponding incoming VNVRAM requests that include the information associated with the passed requests. FIG. 4 is a block diagram of a VNVRAM request that may be advantageously used with the subject matter described herein. The VNVRAM request 400 is illustratively a data structure that includes a source address 402 of the source buffer within the allocated memory of the file system where data associated with an operation (e.g., a modifying data access request, such as a write operation) resides and a destination address 404 where the data is to be stored in the simulated device. In order to process (i.e., log) the request to the simulated device, the VNVRAM driver 260 writes the data of the VNVRAM request 400 to the staging area 320 (used as, e.g., a destination buffer) prior to writing the data to the backing store. The request 400 also includes a size 406 of the data associated with the operation, flags 408 associated with the request and, if appropriate, an array of pre-requisite requests 410, each of which may be identified by a (stream, XID) pair 412. Notably, the VNVRAM driver 260 maintains the processing order specified by interface semantics provided by the file system.

Each stream 360 is essentially a group of VNVRAM requests 400 that the VNVRAM driver 260 may process according to the semantics provided by the access interfaces. In an aspect of the subject matter, the file system 280 may register a stream 360 (e.g., via a stream management interface) associated with a region with the VNVRAM driver 260. The file system may also register a region 340 (e.g., via a region management interface with specified start and length) with the driver. The VNVRAM driver 260 may further create an arbitrary number of lists of VNVRAM requests associated with streams, regions or other groupings advantageous to the processing of the requests. The driver may process the requests 400 in the stream using any of these lists (such as the per-stream list 120 or the per-region list 122) to ensure necessary processing efficiency. For example, the VNVRAM driver 260 may organize VNVRAM requests 400 received from one or more streams 360 within the per-region list 122 (e.g., a linked-list data structure) based on the destination addresses within the staging area 320 (or region 340) that the requests modify and based on the stream, e.g., as provided by an argument to the access interface. It should be noted that the argument may also be used to insert a request on the per-stream list 120. The VNVRAM driver 260 may create these lists along with additional lists (not shown), such as a global list of all allocated requests and a free list of available requests.

In an aspect of the subject matter, the VNVRAM requests 400 of the streams 360 are independent, such that their order of execution is not dependent on requests of other streams. That is, the VNVRAM driver 260 may execute (i.e., process) the requests in each stream based on an order of arrival or in any order without restriction. In this case, the file system 280 (or any other user module of the storage operating system) may not render any assumption with respect to the order of processing the requests. However, if the file system 280 requires ordering of requests within a stream or among streams, such ordering may be imposed using the arguments of the access interfaces.

In an aspect of the subject matter, the VNVRAM driver may be configured to support a first access interface that provides a non-volatile direct memory access (nvdma) write interface having an argument that imposes ordering of requests within a stream. Illustratively, the file system 280 may impose ordering of an incoming request 400 within a stream and associated with the write interface by marking the request with a special flag 408, i.e., an XORDER flag, that specifies dependency to all previous requests in the stream. Specifically, the XORDER flag instructs the VNVRAM driver 260 to ensure that no portions of overlapping previous requests (e.g., describing previous write operations of data) may be persistently stored after the incoming request has been committed to the backing store. The XORDER flag thus has the same effect as ensuring that data of all previous requests of the stream are committed, i.e., processed and persistently stored, on the backing store (local persistent storage 140) before the data of the incoming request marked with the XORDER flag is processed and written to the backing store, but does not necessarily require that all write operations through the access interface be committed to the backing store.

For instance, a write operation that is completely overwritten (overlapped) by a subsequent write operation need not be written to the backing store. As an example, assume requests 1 and 2 are passed (issued) by the file system 280 to the VNVRAM driver 260 in a stream 360 followed by request 3, which is marked with the XORDER flag, and then request 4. According to the semantics of the first interface, the VNVRAM driver 260 may process requests 1 and 2 (e.g., in any order), but must ensure that persistent storage of their associated data is prior to or coincident with persistent storage of the data associated with request 3. It should be noted that the phrase "prior to or coincident with" in connection with persistent storage of data also denotes the processing of any previous overlapping requests, such that no part of any previous overlapping request may be persistently stored in the backing store after the incoming request marked with the XORDER flag is reported as completed (done). The semantics of the first interface are illustratively provided by an extension to an nvdma_write API, i.e., the XORDER flag associated with the first interface.

In an aspect of the subject matter, the VNVRAM driver 260 may organize the VNVRAM requests 400 in any number of lists which represent the requests and their dependencies in an advantageous manner. For example, the VNVRAM driver 260 may organize the VNVRAM requests 400 of any list according to a processing order specified by the semantics of the first interface and thereafter transit the list in any advantageous order to retrieve and process each request. Assume that the data (and operations) specified by requests 1 and 2 may modify respective areas (e.g., regions 340) of the simulated NVRAM (e.g., including the backing store) as specified by the destination addresses 404 of the requests 400; thus, the data associated with the requests may be copied by the driver to the respective region 340 of the kernel memory staging area 320. The VNVRAM driver 260 may then copy the data of request 3 which modifies another area (region) of simulated NVRAM (and the backing store) to the appropriate staging area where it is buffered with the data of requests 1 and 2. Yet, according to the semantics specified by the XORDER flag of the first interface, the driver 260 may not copy the data of request 4 to the staging area 320 until request 3 completes, i.e., until its data is processed and persistently stored on the backing store, as described above.

In an aspect of the subject matter, the flush thread 265 of the VNVRAM driver 260 may implement a flush technique (algorithm) configured to determine which portions of the staging area 320 are modified by the VNVRAM requests 400 and store (write) the data of those requests to the backing store (local persistent storage). Illustratively, the flush thread 260 may be invoked to interpret the interface semantics associated with the VNVRAM requests 400 to write the data to the backing store in accordance with a manner and behavior as expected by the file system 280. Accordingly, the thread may interpret the interface imposed ordering semantics (i.e., the XORDER flag) to determine that requests 1 and 2 are not ordered, but that request 3 is ordered. The thread 265 may further determine that the data of requests 1 and 2 may be written to the backing store to thereby simulate writing of those requests to the NVRAM. The flush thread may then determine that the data of request 3 may be written to the backing store. Thus, even though they are temporarily stored in the staging area, the data of VNVRAM requests 1, 2 and 3 are written to the backing store sequentially (i.e., in order according to one or more disk write operations) as specified by the interface semantics (as provided by the file system) and with the resulting behavior of the NVRAM (as expected by the file system). Illustratively, each write operation to the backing store occurs at a disk transfer granularity of 4 kilobytes (kB). Once the data of request 3 is written to the backing store, the flush thread 265 may process request 4 to, e.g., copy the data of the request to the staging area 320 and thereafter write that request to the backing store. According to the semantics of the first access interface, processing of request 4 is delayed waiting for completion of request 3.

In an aspect of the subject matter, the VNVRAM driver 260 may delay the copying of data provided through the access interface from the source buffer until such time as may be advantageous to the efficiency of writing the data to the backing store and the preservation of the ordering semantics expressed in the interface. Moreover, the VNVRAM driver 260 may agglomerate (gather) VNVRAM requests 400 to minimize the number of disk transfers required to the backing store in order to preserve the semantics expressed through the access interface. After obtaining an XID for the VNVRAM request, the caller of the access interface may not modify the data contents of the source buffer without previously inquiring as to the status of the XID and receiving a response that the operation represented by the access interface is completed.

In an aspect of the subject matter, the driver 260 may recognize and categorize one or more types of dependencies in the lists (dependency lists) to allow for efficient processing of the dependencies to preserve (maintain) semantic order. For example, one type of dependency maintained may be "none". In this case, the data of the VNVRAM request may be immediately copied into the region of the staging area and transferred to the backing store as convenient, provided that the request is not indicated as complete until such transfer has completed. Another type of dependency maintained may be a dependency upon the copying of data for a previous request. Such a dependency may arise from the specification of XORDER in a VNVRAM request when the data lies within the same atomically transferable unit (e.g., 4 kB disk transfer block) as the request upon which the dependency exists. In such cases, it may be necessary only to have copied the previous request data into the block prior to the copy of the data for the second request, since it is only necessary to ensure that the final result of the copies into the block are conveyed to the backing store. Yet another type of dependency maintained may be a dependency upon the commitment of a previous request to the backing store. Such a dependency exists if the two requests are in different atomically transferable units (disk transfer blocks) of the backing store. Such dependencies may result between requests within the same stream or in different streams.

In an aspect of the subject matter, the VNVRAM driver 260 may address the dependencies by following a dependency list (e.g., the global list) back to the first independent request and then processing all dependent requests until the desired XID dependencies have been satisfied. The driver may suspend the processing for purposes of satisfying performance policies. Such processing need not necessarily handle all requests in order, since there may be multiple lists of dependencies extant at once in the global list. As provided in the access interface, the VNVRAM driver may copy data from the source buffer to a region of the staging area whenever it is convenient and semantically appropriate to do so in order to satisfy the semantic requirements of the interface.

In an aspect of the subject matter, the VNVRAM driver 260 may maintain any combination of data and algorithms used to determine which requests should be completed at what time in order to (i) minimize the number of transfers to the backing store; (ii) ensure a certain maximum latency for requests through an access interface; (iii) optimize the total number of requests that can be processed through the access interface in a given time; (iv) prioritize processing of requests associated with one stream over another; or (v) such other factors as required to achieve the desired performance of the system. The above determination is referred to as one or more performance policies. Factors in performance policy may include (a) the number of outstanding requests on a stream and comparison of the same to a fixed or adjustable limit; (b) the time that a request is outstanding and comparison of the same to a fixed or adjustable limit, and (c) the adjustment of limits for outstanding count or outstanding time based on statistical measurement of past performance of the system in servicing requests.

In an aspect of the subject matter, the file system may impose ordering of a request with respect to one or more requests organized among different streams by issuing a second access interface, i.e., an ordered write interface (nvdma_ordered_write API), which specifies the completion of one or more requests prior to completion of the request associated with the second interface. Here, an incoming request 400 associated with the ordered write interface may specify one or more previous requests, i.e., pre-requisite requests 410, that provide dependency to the incoming request, i.e., a "dependent write". That is, the semantics of the ordered write interface ensure that the data of the incoming request 400 may not be persistently stored in the backing store until data for all of the specified pre-requisite requests 410 upon which the dependency (i.e., the dependent write) exists are persistently stored (written) in the backing store. Illustratively, each pre-requisite request 410 is identified by a (stream, XID) pair 412, wherein the stream is an identifier of the stream 360 on which the pre-requisite request resides and the XID is a transfer identifier of the pre-requisite request.

For example, assume that the file system 280 issues request 5 via stream 1 and request 6 via stream 2. In the absence of any specified ordering by the file system, the VNVRAM driver 260 may process these requests in any order. Yet if the file system wants to ensure that the data of request 5 is processed and persistently stored prior to persistent storage of the data for request 6, the second interface may be employed (called) to specify request 5 as dependency to request 6. In other words, the second interface semantics instruct the driver 260 to ensure that the data for request 5 is persistently stored in the backing store prior to or coincident with persistent storage of the data of request 6 in the backing store.

Figure 5:
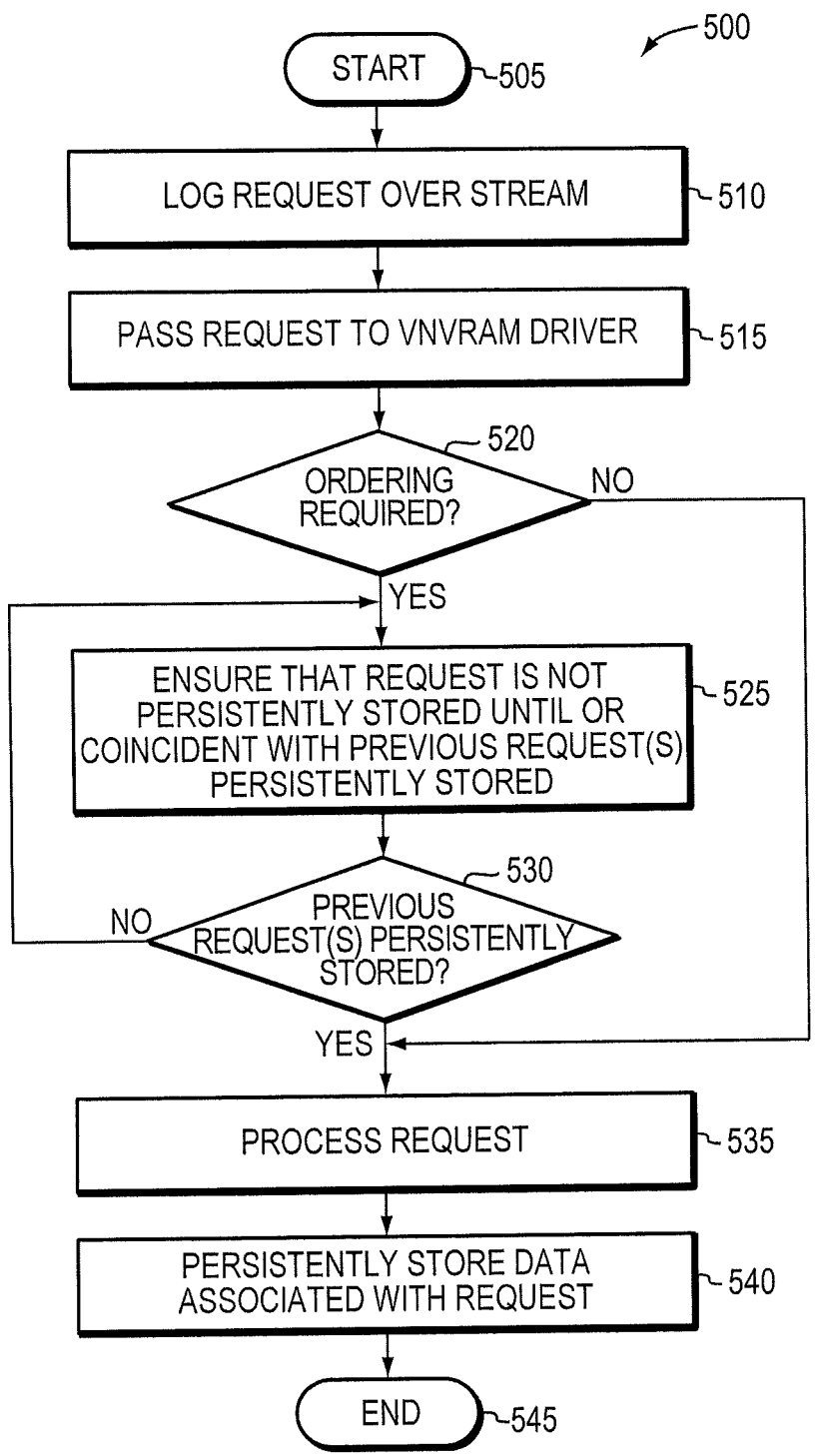
FIG. 5 is an example simplified procedure for simulating a persistent random-access, byte-addressable storage device on a persistent random-access, block-addressable storage device of the storage system configured to enable asynchronous buffered access to information persistently stored on the block-addressable device.

FIG. 5 is an example simplified procedure for simulating a persistent random-access, byte-addressable storage device on a persistent random-access, block-addressable storage device of a storage system configured to enable asynchronous buffered access to information persistently stored on the block-addressable device. The procedure 500 starts at step 505 and proceeds to step 510 where a user module of the NVRAM, e.g., the file system, logs operations (e.g., VNVRAM requests) over one or more streams when processing client requests, e.g., modifying data access requests such as a write operation with associated data. At step 515, the file system passes each request to the VNVRAM driver using an access interface with arguments. At step 520, the VNVRAM driver examines the arguments of the interface to determine whether ordering of the request (e.g., within a stream via the XORDER flag or among other streams via the dependent write) is specified (required). If ordering is not required, the request is processed at step 535 and data associated with the request is persistently stored, e.g., on the backing store, at step 540. The procedure then ends at step 545.

However, if ordering is required (step 520), the VNVRAM driver interprets the semantics (including arguments) of the access interface to ensure that the data associated with the request is not persistently stored, e.g., on the block-addressable device until data for all dependent (previous) requests specified by the interface are persistently stored (step 525). For example, the VNVRAM driver may examine the arguments of the first access interface to determine that ordering of the request within a stream is imposed in accordance with the XORDER flag. Accordingly, the VNVRAM driver is instructed to ensure that the data of all previous requests of the stream are persistently stored on the block-addressable device (i.e., backing store) before or coincident with the data for the request marked with the XORDER flag being persistently stored in the backing store. In addition, the VNVRAM driver may examine the arguments of the second access interface to determine that ordering of the request with respect to previous requests among streams is imposed in accordance with the pre-requisite requests specified in the dependent write. Accordingly, the VNVRAM driver is instructed to ensure that the data of the request is not persistently stored until the data of all previous requests (as specified by the pre-requisite requests) are persistently stored in the backing store. At step 530, a determination is made as to whether the previous requests are persistently stored. If not, the procedure returns to step 525; otherwise if the previous requests are persistently stored, the procedure proceeds to step 535 where the request is processed and, at step 540, its associated data is persistently stored. The procedure then ends at step 545.

While there have been shown and described illustrative subject matter for simulating a persistent random-access, byte-addressable storage device on a persistent random-access, block-addressable storage device of a storage system configured to enable asynchronous buffered access to information persistently stored on the block-addressable device, it is to be understood that various other adaptations and modifications may be made within the spirit and scope of the subject matter herein. For example, the subject matter has been shown and described herein with relation to ordering dependency among requests within one or more streams. In the situation that requires ordering dependency of requests within other streams, processing of a request in a first stream may be interrupted (paused) as mandated by a dependent write (ordered write) request of the second access interface to enable persistent storage of data for one or more pre-requisite requests in another stream. Here, the VNVRAM driver may obtain the pre-requisite requests specified by (stream, XID) pairs from the second interface and may locate those requests for pre-requisite processing (and persistent storage) within the other stream(s). Once it has completed those requests, the driver may return to the paused stream and process the paused dependent write request for persistent storage. However, a restriction with the dependent write request associated with the second access interface is that there may not be a circular dependency back to the paused stream or else a deadlock situation may arise. Note that the (stream, XID) pairs of pre-requisite requests are provided to the VNVRAM driver before processing of the request for persistent storage by the driver so that it may obviate any circular dependency.

Advantageously, the staging area of the kernel memory may be utilized to temporarily store a sufficient amount of requests (data) destined for persistent storage so as to amortize overhead of disk write operations to the backing store among all the requests. Although temporary storage (buffering) of the requests may present some latency in replying acknowledgments of completion to the client, an increase in input/output (I/O) per second throughput may be realized by the buffering associated with the staging area, as described herein. Additionally, the access interfaces may be utilized to preserve an order of changes associated with modifying requests to the simulated device (including the backing store) as expected by users of the simulated device.

The foregoing description has been directed to specific subject matter. It will be apparent, however, that other variations and modifications may be made to the described subject matter, with the attainment of some or all of its advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the subject matter herein. Therefore, it is the object of the appended claims to cover all such variations and modifications as come within the true spirit and scope of the subject matter herein.

What is claimed is:

1. A method comprising:
   logging an incoming request within a stream in response to receiving one or more storage operations;
   passing the incoming request to a driver using an access interface with one or more arguments;
   examining the arguments of the access interface to determine when ordering of the incoming request is specified;
   determining, prior to storing incoming data of the incoming request on a non-volatile block-addressable storage device, when data for each of one or more dependent requests is persistently stored on the non-volatile block-addressable storage device, when the examining the arguments indicates a determination that the ordering of the incoming request is specified; and
   persistently storing the incoming data of the incoming request in the non-volatile block-addressable storage device, when the determining indicates that the data for each of the one or more dependent request is persistently stored on the non-volatile block-addressable storage device, wherein the non-volatile block-addressable storage device is configured to simulate a byte-addressable storage device.

2. The method of claim 1 wherein the driver is a virtual non-volatile random access memory (VNVRAM) driver, the non-volatile block-addressable storage device is local persistent storage embodied as a backing store, and the byte-addressable storage device is a NVRAM.

3. The method of claim 2 wherein the VNVRAM driver includes a flush thread, and wherein persistently storing the incoming data comprises persistently storing the incoming data in the backing store using the flush thread.

4. The method of claim 1 wherein examining the arguments of the access interface comprises:
   determining that ordering of the incoming request within the stream is imposed based on an XORDER flag argument of the access interface.

5. The method of claim 1 wherein examining the arguments of the access interface comprises:
   determining that ordering of the incoming request among one or more other streams is imposed based on a (stream, transfer identifier (XID)) pair specified as an argument of the access interface.

6. The method of claim 5 wherein the access interface is embodied as a dependent write interface, each of the dependent request is identified by one of a plurality of (stream, XID) pairs, the stream of each of the (stream, XID) pairs is an identifier of one of the one or more other streams on which one of the dependent requests resides, and the XID of each of the (stream, XID) pairs is a transfer identifier of one of the dependent requests.

7. A system comprising:
   a processor;
   a non-volatile block-addressable storage device coupled to the processor and configured to simulate a byte-addressable storage device, the non-volatile block-addressable storage device embodied as persistent storage; and
   a memory coupled to the processor and containing machine readable medium comprising machine executable code embodied as a driver that when executed by processor causes the processor to:
   log an incoming request within a stream in response to receiving one or more storage operations:
   pass the incoming request to a driver using an access interface with one or more arguments;
   examine the arguments of the access interface to determine when ordering of the incoming request is specified;
   determine, prior to storing incoming data of the incoming request on the non-volatile block-addressable storage device, when data for each of one or more dependent request is persistently stored on the non-volatile block-addressable storage device, when the examination of the arguments indicates a determination that the ordering of the incoming request is specified; and
   persistently store the incoming data of the incoming request in the non-volatile block-addressable storage device, when the determination indicates that the data for each of one or more dependent request is persistently stored on the non-volatile block-addressable storage device, wherein the non-volatile block-addressable storage device is configured to stimulate a byte-addressable storage device.

8. The system of claim 7 wherein the driver is a virtual non-volatile random access memory (VNVRAM) driver, the non-volatile block-addressable storage device is local persistent storage embodied as a backing store, and the byte-addressable storage device is a NVRAM.

9. The system of claim 8 wherein the VNVRAM driver includes a flush thread, and wherein persistently storing the incoming data comprises persistently storing the incoming data in the backing store using the flush thread.

10. The system of claim 7 wherein the machine executable code when executed by the processor further causes the processor to determine that ordering of the incoming request within the stream is imposed based on an XORDER flag argument of the access interface.

11. The system of claim 7 wherein the machine executable code when executed by the processor further causes the processor to determine that ordering of the incoming request among one or more other streams is imposed based on a (stream, transfer identifier (XID)) pair specified as an argument of the access interface.

12. The system of claim 11 wherein the access interface is embodied as a dependent write interface, each of the dependent requests is identified by one of a plurality of (stream, XID) pairs, the stream of each of the (stream, XID) pairs is an identifier of one of the one or more other streams on which one of the dependent requests resides, and the XID of each of the (stream, XID) pairs is a transfer identifier of one of the dependent requests.

13. A non-transitory computer readable medium including program instructions for performing a method comprising machine executable code which when executed by at least one machine, causes the machine to:
    log an incoming request within a stream in response to receiving one or more storage operations;
    pass the incoming request to a driver using an access interface with one or more arguments;
    examine the arguments of the access interface to determine when ordering of the incoming request is specified;
    determine, prior to storing incoming data of the incoming request on a non-volatile block-addressable storage device, when data for each of one or more dependent requests is persistently stored on the non-volatile block-addressable storage device, when the examination of the arguments indicates a determination that the ordering of the incoming request is specified; and
    persistently store the incoming data of the incoming request on the non-volatile block-addressable storage device, when the determining indicates that the data for each of the one or more dependent requests is persistently stored on the non-volatile block-addressable storage device, wherein the non-volatile block-addressable storage device is configured to simulate a byte-addressable storage device.

14. The non-transitory computer readable medium of claim 13 wherein the driver is a virtual non-volatile random access memory (VNVRAM) driver, the non-volatile block-addressable storage device is local persistent storage embodied as a backing store, and the byte- addressable storage device is a NVRAM.

15. The non-transitory computer readable medium of claim 14 wherein the VNVRAM driver includes a flush thread, and wherein the machine executable code when executed by the machine further causes the machine to persistently store the incoming data on the backing store using the flush thread.

16. The non-transitory computer readable medium of claim 13 wherein the machine executable code when executed by the machine further causes the machine to:
    determine that ordering of the incoming request within the stream is imposed based on an XORDER flag argument of the access interface.

17. The non-transitory computer readable medium of claim 13 wherein the machine executable code when executed by the machine further causes the machine to:
    determine that ordering of the incoming request among one or more other streams is imposed based on a (stream, transfer identifier (XID)) pair specified as an argument of the access interface.

18. The non-transitory computer readable medium of claim 17 wherein the access interface is embodied as a dependent write interface, each of the dependent requests is identified by one of a plurality of (stream, XID) pairs, the stream of each of the (stream, XID) pairs is an identifier of one of the one or more other streams on which one of the dependent requests resides, and the XID of each of the (stream, XID) pairs is a transfer identifier of one of the dependent requests.

* * * * *